United States Patent [19]
Chiu

[11] Patent Number: 6,053,518
[45] Date of Patent: Apr. 25, 2000

[54] BICYCLE TRAILER

[76] Inventor: Ping-Jan Chiu, No. 1146, Chung-Shan Rd., Ta-Chia Chen, Taichung Hsien, Taiwan

[21] Appl. No.: 09/031,044

[22] Filed: Feb. 26, 1998

[51] Int. Cl.[7] .................................................. B62K 27/12
[52] U.S. Cl. ........................... 280/204; 280/292; 280/656
[58] Field of Search .................................... 280/204, 292, 280/647, 644, 650, 656, 657, 47.131, 642, 424; 224/426

[56] References Cited

U.S. PATENT DOCUMENTS

| | | | |
|---|---|---|---|
| 5,020,814 | 6/1991 | George et al. | 280/204 |
| 5,267,744 | 12/1993 | Berry et al. | 280/204 |
| 5,669,618 | 9/1997 | Chiu | 280/204 |
| 5,829,770 | 11/1998 | Chiu | 280/642 |
| 5,829,771 | 11/1998 | Hsu | 280/292 |

*Primary Examiner*—Anne Marie Boehler
*Attorney, Agent, or Firm*—McDermott, Will & Emery

[57] ABSTRACT

A bicycle trailer includes a looped carrier frame and two pairs of vertical sleeves which extend upward from front and rear end portions of the carrier frame. The sleeves have surrounding walls of U-shaped horizontal cross-section, thereby forming vertical openings in the surrounding walls. Each surrounding wall is provided with two opposing horizontally aligned holes. A plurality of horizontal pivot members extend through the aligned holes substantially in parallel with a line that extends from the front end portion to the rear end portion of the carrier frame. Each of a pair of curved support rods has two end portions which are inserted respectively into one of the sleeves of the front end portion and one of the sleeves of the rear end portion. The end portions of the support rods have horizontally extending tubular members to be sleeved rotatably and respectively on the pivot members so as to turn the support rods by passage through the openings in the surrounding walls, thereby permitting the support rods to turn upward to an upright position or downward to a storage position.

1 Claim, 8 Drawing Sheets

BICYCLE TRAILER

BACKGROUND OF THE INVENTION

1. Field of the Invention

This invention relates to a bicycle trailer for towing by a bicycle, more particularly to a bicycle trailer with a carrier frame and two foldable roof supporting rods which can be easily turned upward to an upright position and downward to a storage position.

2. Description of the Related Art

Referring to FIGS. 1 and 2, a conventional bicycle trailer 1 is shown to include a looped carrier frame 11, a pair of support rods 12, a top bracing rod 121 for bridging the support rods 12, a connecting device 14 for connecting the carrier frame 11 to a bicycle (not shown) two wheels 15 mounted on two side portions 112 of the carrier frame 11, and a roof 17 mounted to the support rods 12 and the carrier frame 11.

Two pairs of vertical stubs 113 extend upward from the carrier frame 11. Four quick-releasing locking units 13 are connected to ends of the support rods 12 and the stubs 113. With reference to FIGS. 2 and 3, each locking unit 13 includes a lower half 133 which has a lower tubular section 135 sleeved securely on the stub 113 and an upper annular ring 130 with teeth 136, an upper half 134 which has an upper annular ring 138 provided with teeth 1381 to mesh with the teeth 136 and an upper tubular section 137, a compression spring 131 interposed between the rings 130, 138, and a lock bolt 1392 extending through the rings 130, 138 to engage a nut 1391. The lock bolt 1392 is riveted eccentrically to a stop cam 132 by a rivet 1393 so as to fasten the upper half 134 to the lower half 133 by rotating the cam 132. Thus, the pivotal connection of the support rods 12 with the stubs 113 is achieved.

However, when the support rods 12 are to be turned downward to the storage position, the top brace rod 121 must be detached from the support rods 12 before the connection between the lower and upper annular rings 138, 130 can be loosened by rotating the stop cam 132, thereby resulting in inconvenience during assembly and disassembly of the trailer 1. In addition, the construction of the quick-releasing locking units 13 complicates the manufacture of the same.

SUMMARY OF THE INVENTION

The object of the present invention is to provide a foldable bicycle trailer which facilitates connection of roof support rods to a carrier frame.

According to this invention, a bicycle trailer includes a looped carrier frame and two vertical sleeves which extend upward from each of a front end portion and a rear end portion of the carrier frame. The sleeves have surrounding walls of U-shaped horizontal cross-section, thereby forming vertical openings in the surrounding walls. Each surrounding wall is provided with two opposing horizontally aligned holes. A plurality of horizontal pivot members extend through the aligned holes of the surrounding walls substantially in parallel with a line that extends from the front end portion to the rear end portion of the carrier frame. Each of a pair of curved support rods has two end portions which are inserted respectively into one of the sleeves of the front end portion and one of the sleeves of the rear end portion. The end portions of the support rods have horizontally extending tubular members to be rotatably and respectively sleeved on the pivot members so as to turn the support rods by passage through the openings in the surrounding walls, thereby permitting the support rods to turn upward to an upright position or downward to a storage position of the support rods.

BRIEF DESCRIPTION OF THE DRAWINGS

Other features and advantages of the present invention will become apparent in the following detailed description of the preferred embodiments of the invention, with reference to the accompanying drawings, in which.

DETAILED DESCRIPTION OF THE PREFERRED EMBODIMENTS

Figure 1:
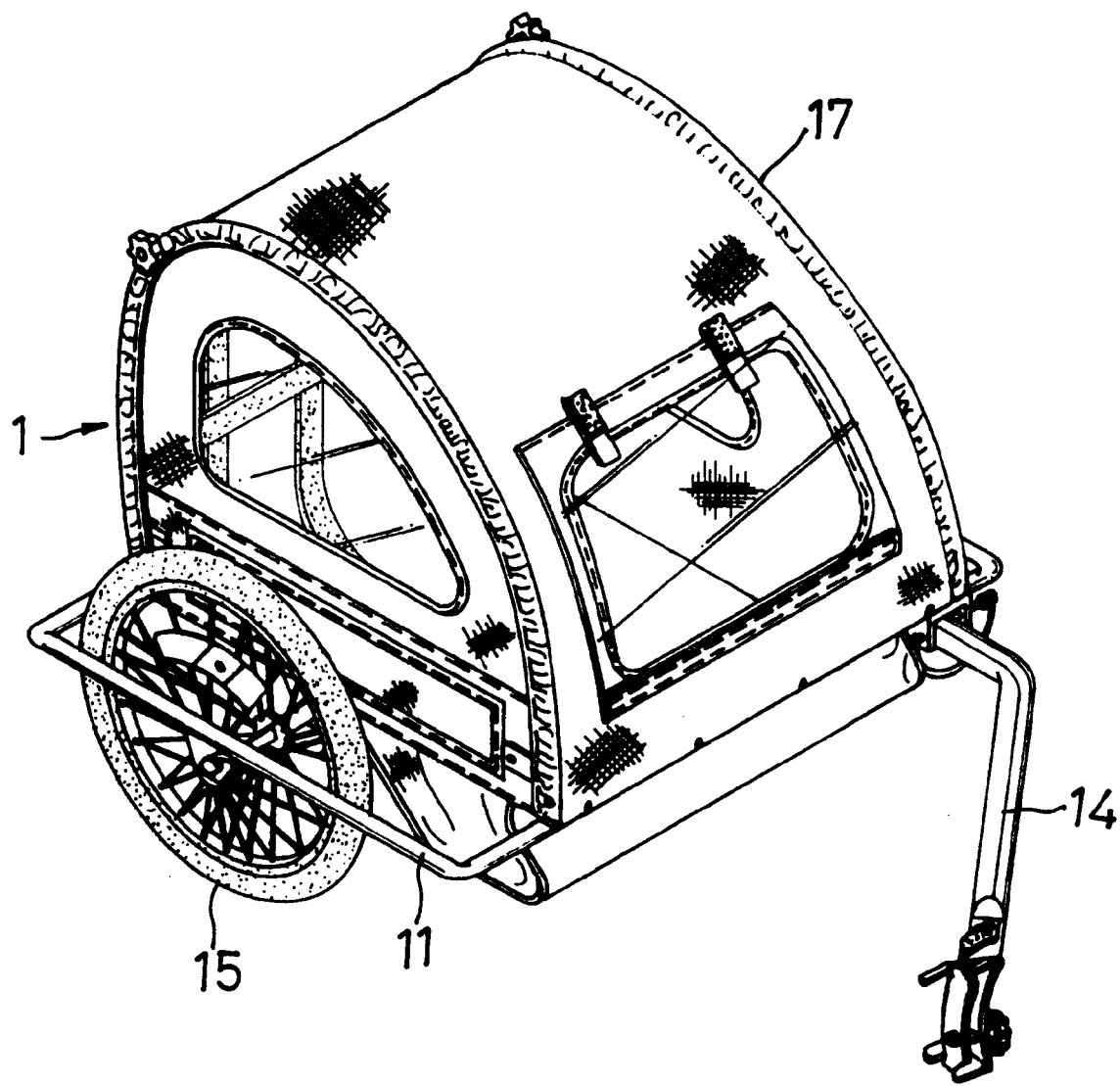
FIG. 1 is a perspective view of a conventional bicycle trailer.

Before the present invention is described in greater detail, it should be noted that same reference numerals have been used to denote like elements throughout the specification.

Figure 4:
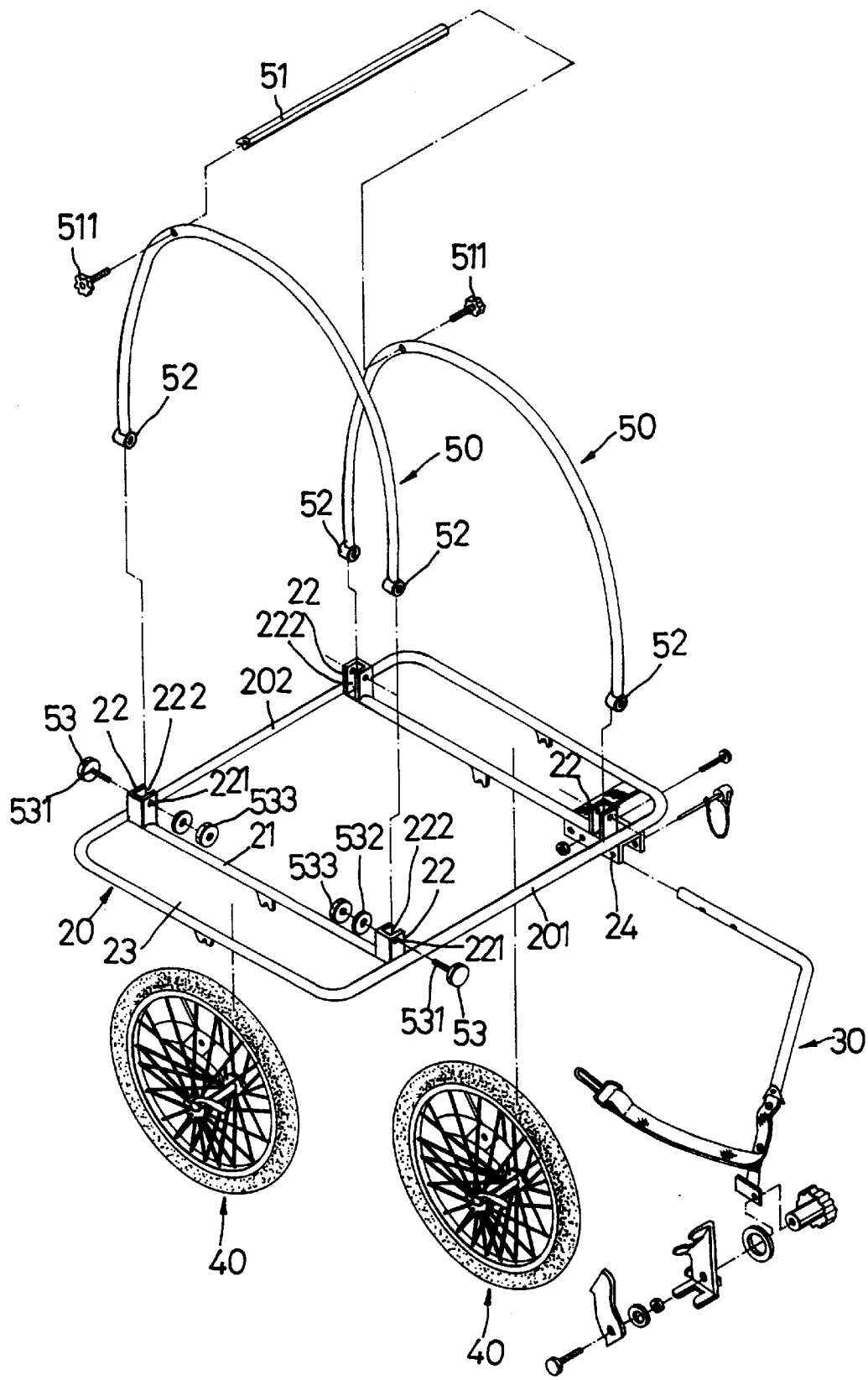
FIG. 4 is an exploded view of a first preferred embodiment of a bicycle trailer according to this invention.

Referring to FIG. 4, the first preferred embodiment of a bicycle trailer according to the present invention is shown to comprise a substantially rectangular carrier frame 20 with two fixed horizontal mounting rods 21, each of which has two ends mounted to front and rear end portions 201, 202 of the carrier frame 20 in order to confine two receiving spaces 23 for receiving two wheels 40. A pivot seat 24 is secured to a bottom of the front end portion 201 for mounting detachably a connecting device 30 that is adapted to be coupled with a bicycle (not shown). A pair of curved support rods 50 have end portions to engage respectively two pairs of vertical sleeves 22. Each pair of the vertical sleeves 22 extend upward from the front and rear end portions 201, 202 adjacent to two ends of each mounting rod 21. A top horizontal brace member 51 bridges the pair of support rods 50 and is fastened to the latter by two bolts 511 so that a roof (not shown) can be mounted on the brace member 51 and the support rods 50.

Figure 5:
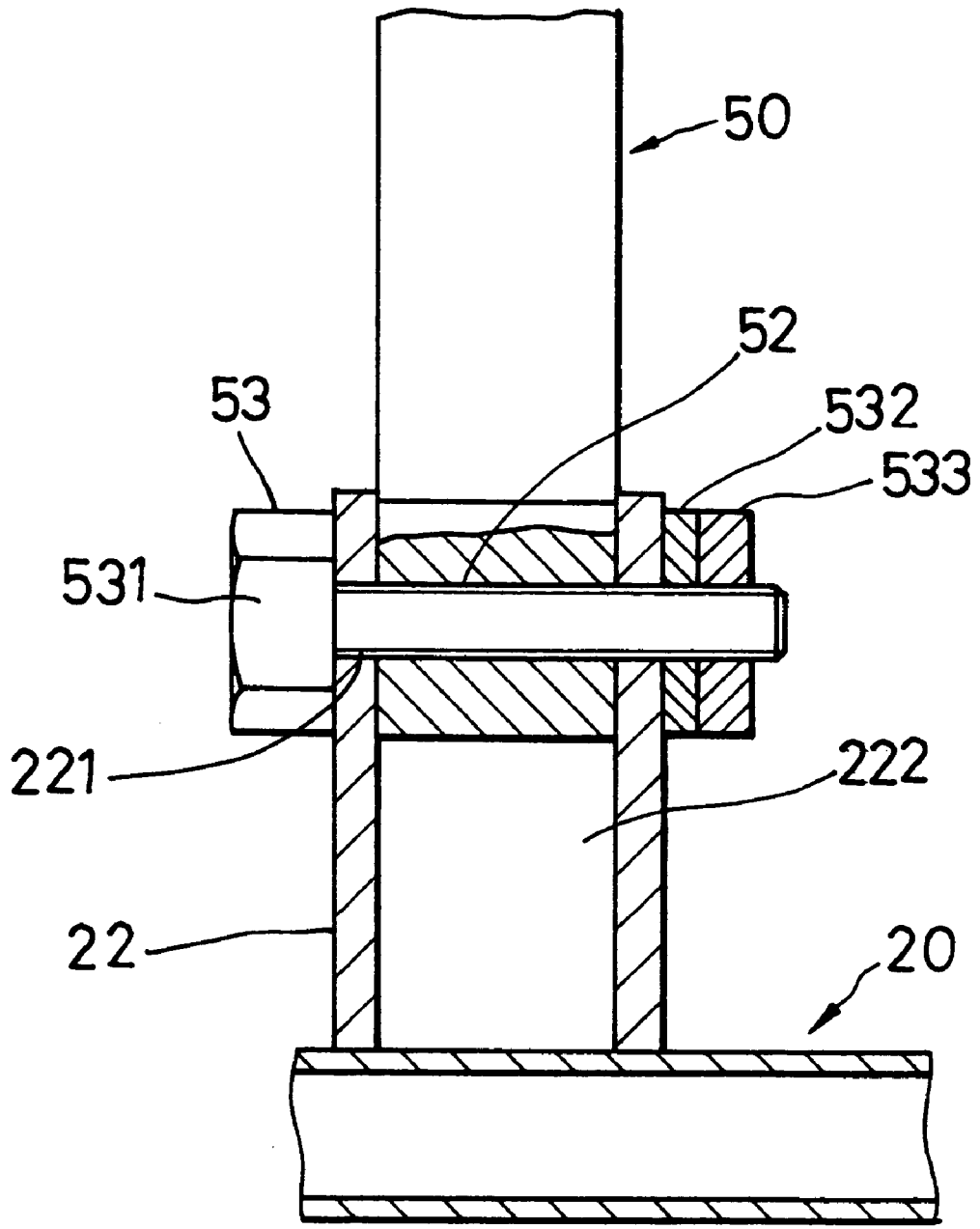
FIG. 5 is a sectional view showing the connection between a carrier frame and a support rod according to the first preferred embodiment.

Each sleeve 22 has a surrounding wall of U-shaped horizontal cross-section for forming a vertical opening 222 therein. The surrounding wall of the sleeve 22 is provided with two opposing horizontally aligned holes 221. With reference to FIGS. 4 and 5, a horizontal pivot member 53 has a pivot bolt 531 which extends through the aligned holes 221 of the surrounding wall of each sleeve 22 substantially in parallel with a line that extends from the front end portion 201 to the rear end portion 202. The end portions of each support rod 50 have horizontally extending tubular members 52 which are inserted respectively into one of the sleeves 22 of the front end portion 201 and one of the sleeves 22 of the rear end portion 202. Each tubular member 52 is further sleeved rotatably on the pivot bolt 531 within the corresponding sleeve 22. The openings 222 of the sleeves 22 permit passage of the end portions of the support rods 50 to turn upward or downward by loosening the bolts 511. A washer 532 and a nut 533 are employed to prevent release of the pivot bolt 531 from the sleeve 22.

Figure 2:
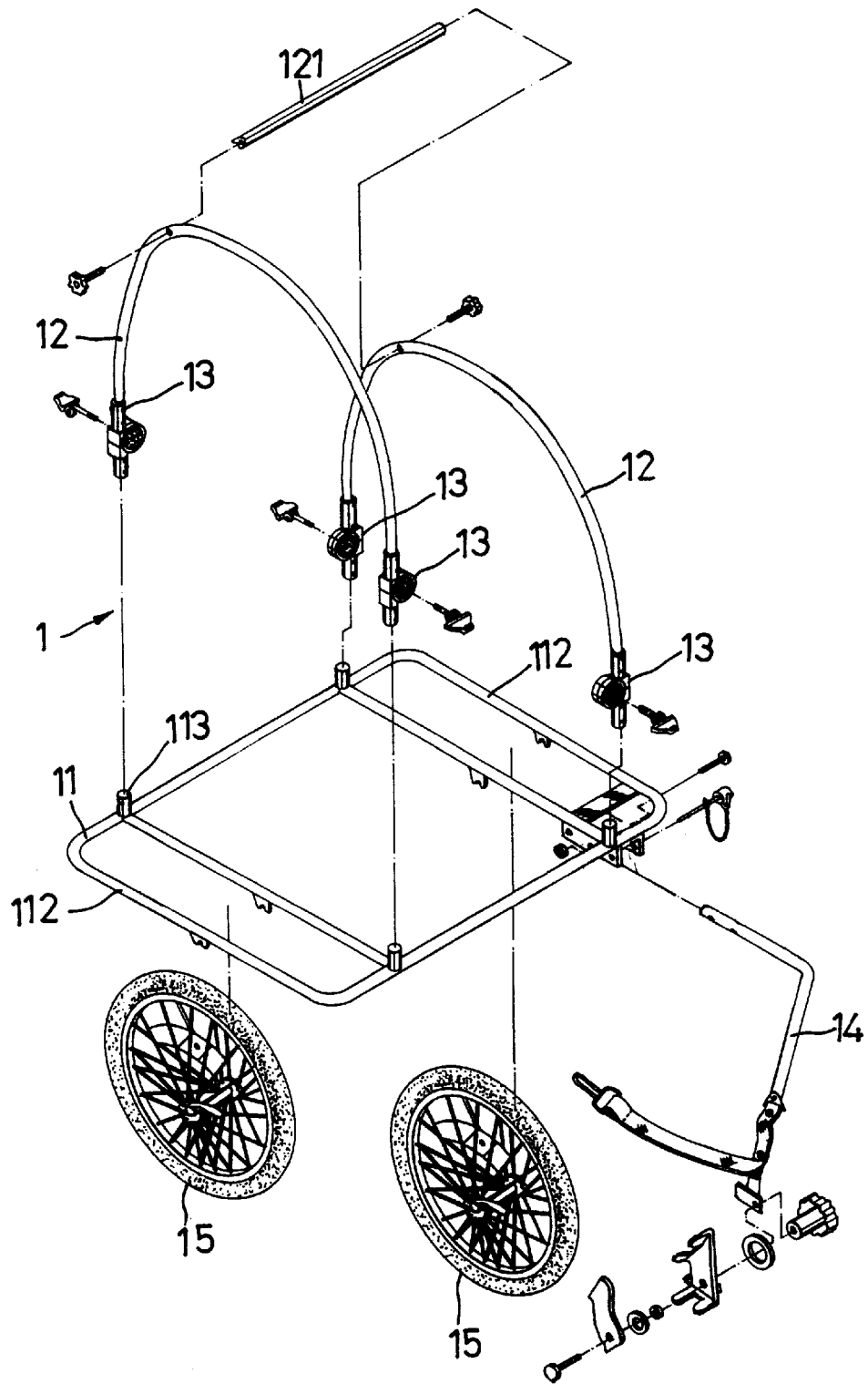
FIG. 2 is an exploded view of the bicycle trailer shown in FIG. 1, a roof thereof being removed for the sake of clarity.
Figure 3:
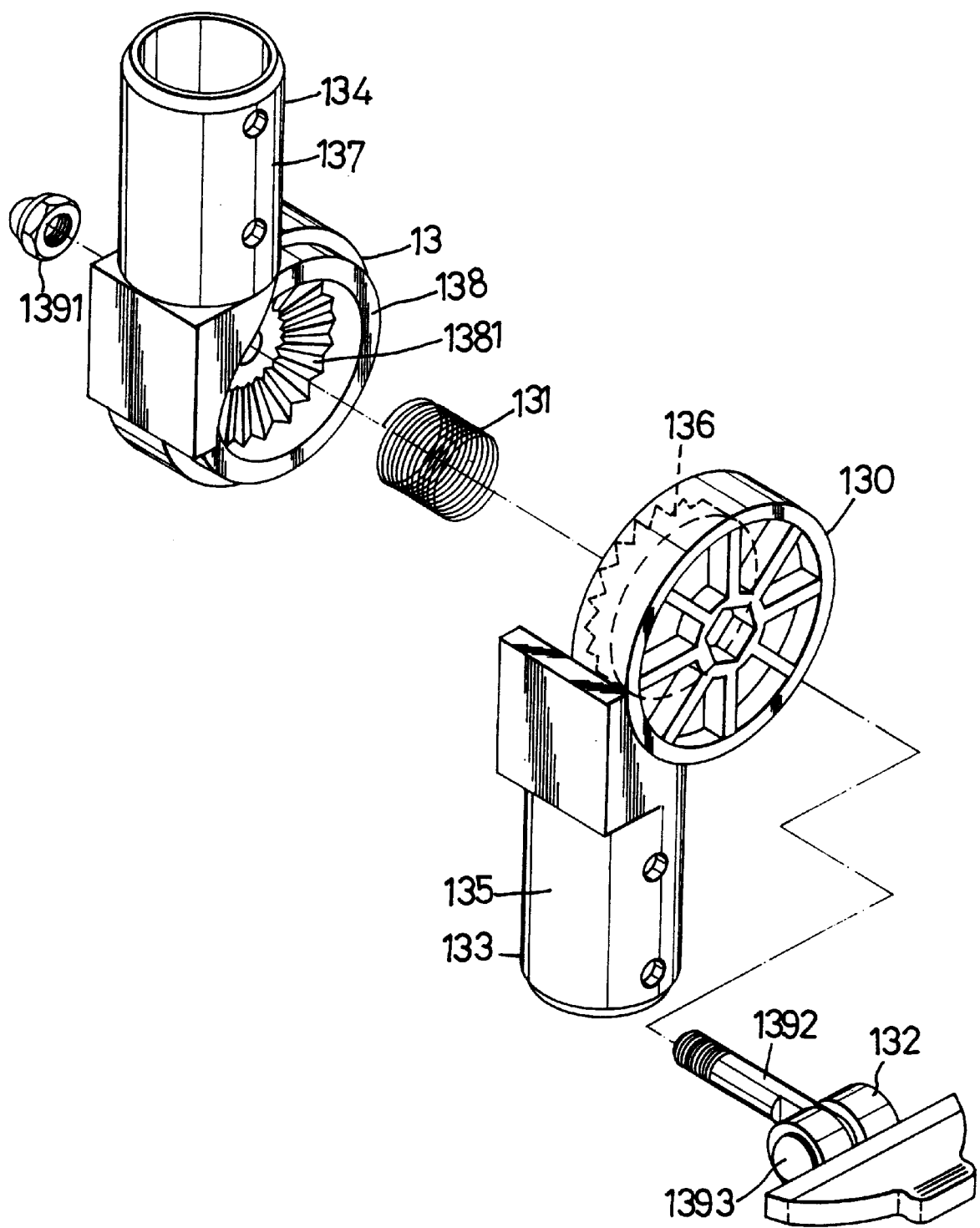
FIG. 3 is an exploded view of a quick-release locking unit employed in the conventional bicycle trailer.
Figure 6:
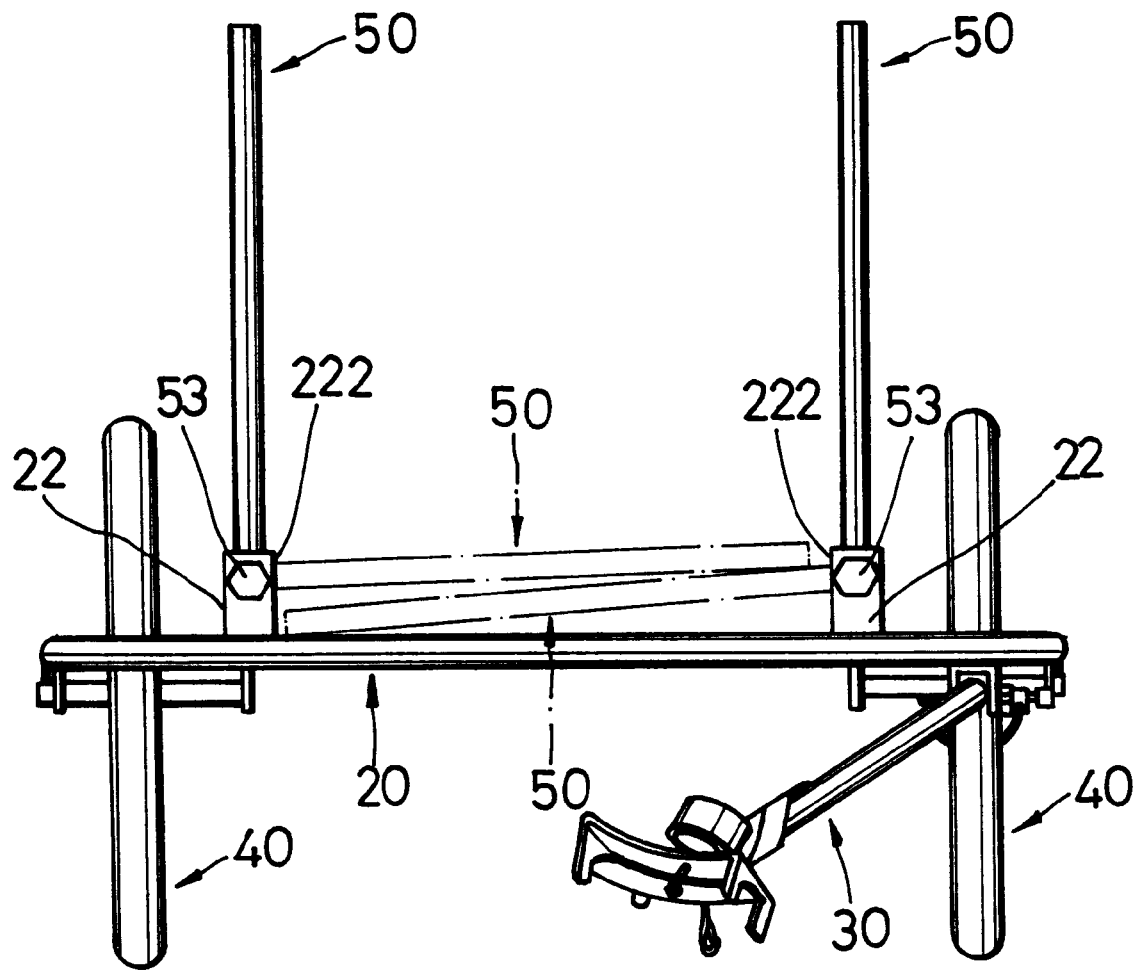
FIG. 6 is a front side view of the foldable bicycle trailer shown in a state for storage.

When the support rods 50 are to be turned downward to the storage position, the brace member 51 is merely detached from the support rods 50 by rotating the bolts 511. As such, the support rods 50 can be turned downward to lie on the carrier frame 20, as shown in FIG. 6, thereby placing the same in the storage position conveniently. In addition, there is no need to provide the quick-releasing locking units 13 as taught in the conventional bicycle trailer 1 (see FIG. 2).

Figure 7:
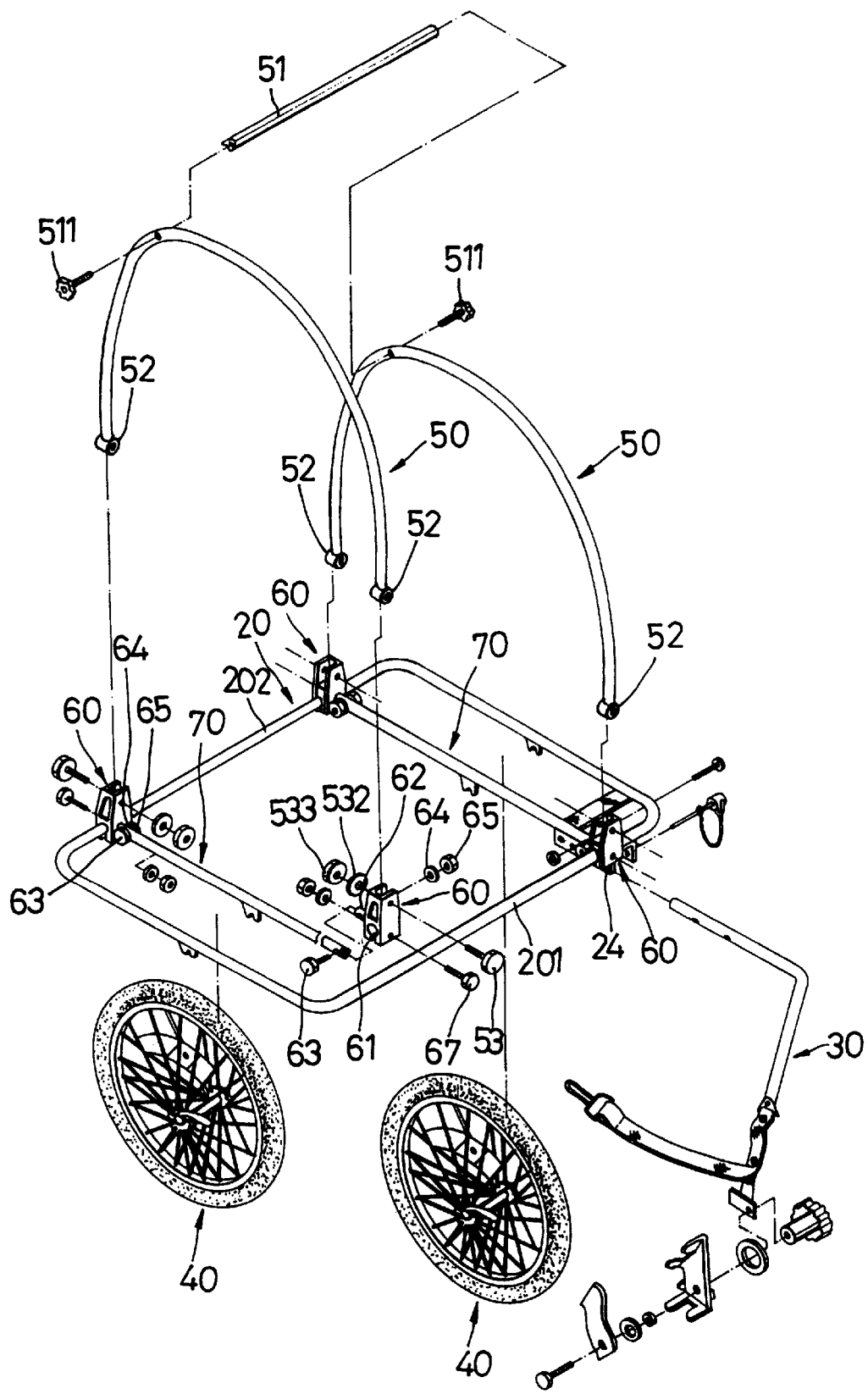
FIG. 7 is an exploded view of a second preferred embodiment of a bicycle trailer according to this invention.
Figure 8:
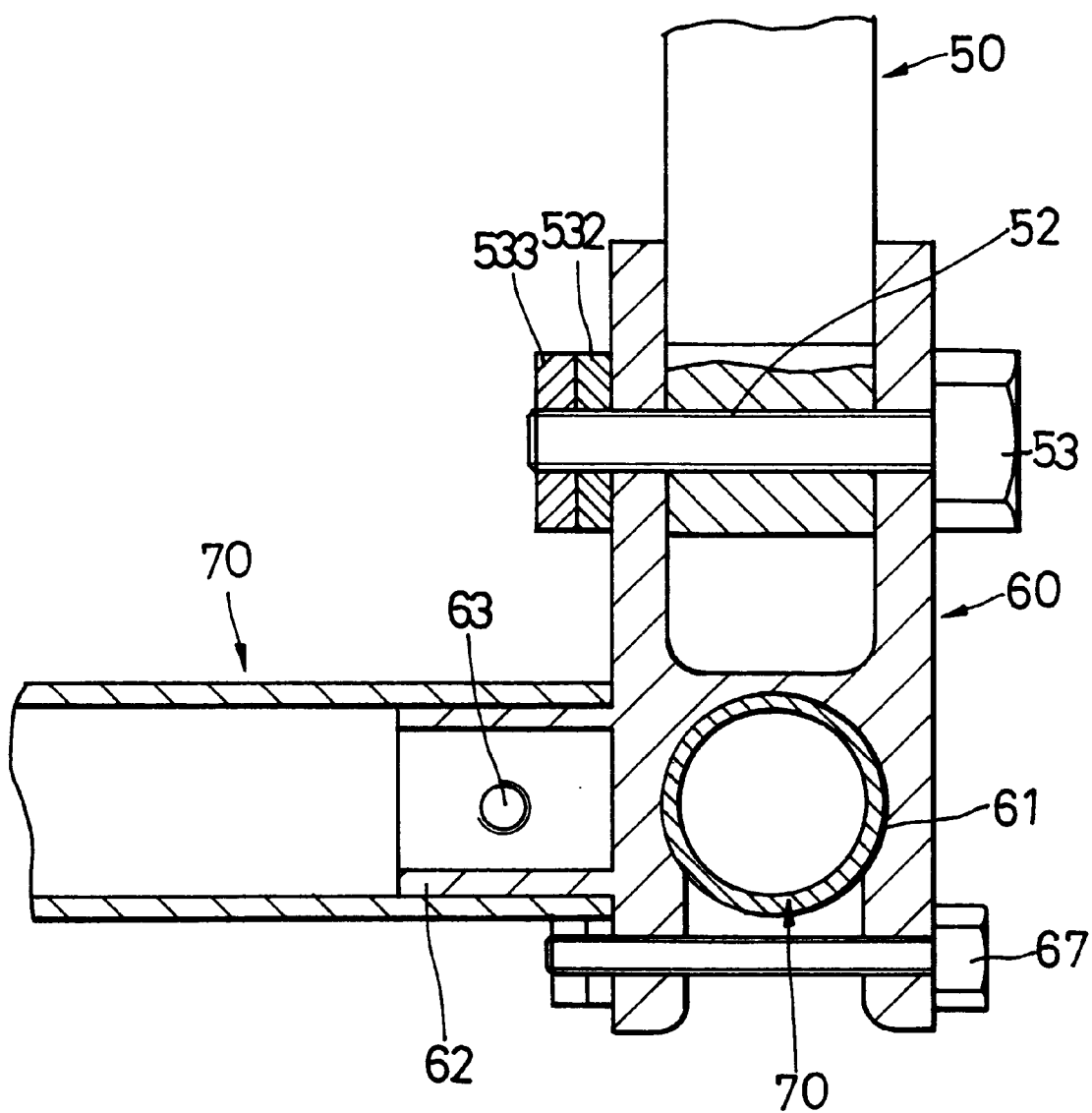
FIG. 8 is a sectional view showing the connection between a carrier frame and a support rod according to the second preferred embodiment.

Referring to FIGS. 7 and 8, a foldable bicycle trailer according to a second preferred embodiment of this invention is shown. Unlike the first preferred embodiment, horizontal mounting rods 70 are mounted detachably to the front and rear end portions 201, 202 of the carrier frame 20. Vertical sleeves 60, made of a plastic or rubber material, include concaved bottom portions 61 to straddle on the front and rear end portions 201, 202, respectively. Tubular tails 62 project horizontally from the sleeves 60 to be inserted respectively into the ends of the mounting rods 70. A plurality of locking fasteners have fastening bolts 63, washers 64 and nuts 65 to fasten respectively the tubular tails 62 to the ends of the mounting rods 70. Additional locking fasteners 67 extend though the sleeves 60 at lower ends of the concaved bottom portions 61 for locking the sleeves 60 on the carrier frame 20. In this embodiment, since the mounting rods 70 and the sleeves 60 are formed separately and are connected together by means of the fastening bolt 63, a welding operation is not required. The sleeves 60 can be conveniently replaced when damaged.

While the present invention has been described in connection with what is considered the most practical and preferred embodiments, it is understood that this invention is not limited to the disclosed embodiments but is intended to cover various arrangements included within the spirit and scope of the broadest interpretations and equivalent arrangements.

I claim:

1. A bicycle trailer for towing by a bicycle, comprising:

a looped carrier frame having a front end portion, a rear end portion, and two side portions interconnecting said front and rear end portions;

two vertical sleeves extending upward from each of said front end portion and said rear end portion, said sleeves having surrounding walls of U-shaped horizontal cross-section, thereby forming vertical openings in said surrounding walls, each of said surrounding walls being provided with two opposing horizontally aligned holes;

two wheels provided respectively on said side portions of said carrier frame;

a plurality of horizontal pivot members, each of which extends through said aligned holes of the corresponding one of said surrounding walls substantially in parallel with a line that extends from said front end portion to said rear end portion of said carrier frame;

a pair of curved support rods, each having two end portions which are inserted respectively into one of said sleeves of said front end portion and one of said sleeves of said rear end portion, said end portions of said support rods having horizontally extending tubular members sleeved rotatably and respectively on said pivot members so as to turn said curved support rods by passage through said openings in said surrounding walls, thereby permitting said support rods to turn upward to an upright position or downward to a storage position of said support rods;

a top horizontal brace member which bridges said pair of said support rods;

wherein said carrier frame further has two horizontal mounting rods, each having two ends mounted respectively and detachably to said front and rear end portions; said sleeves including concaved bottom portions to straddle on said front and rear end portions, respectively, tubular tails projecting horizontally from said sleeves for insertion respectively into said ends of said mounting rods, and a plurality of locking fasteners to fasten said tubular tails to said ends of said mounting rods, respectively.

* * * * *